United States Patent

Töyrylä

[11] Patent Number: 5,901,363
[45] Date of Patent: * May 4, 1999

[54] METHOD AND APPARATUS FOR PRIORITIZING PLURAL REQUESTS BY SUBSCRIBERS FOR SPEECH ITEMS IN A GROUP CALL ON A RADIO PATH

[75] Inventor: Hannu Töyrylä, Vantaa, Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/495,503
[22] PCT Filed: Jan. 25, 1994
[86] PCT No.: PCT/FI94/00034
§ 371 Date: Sep. 18, 1995
§ 102(e) Date: Sep. 18, 1995
[87] PCT Pub. No.: WO94/17642
PCT Pub. Date: Aug. 4, 1994

[30] Foreign Application Priority Data

Jan. 26, 1993 [FI] Finland ..................................... 930322

[51] Int. Cl.$^6$ ..................................................... H04B 7/14
[52] U.S. Cl. .......................... 455/527; 455/512; 455/518
[58] Field of Search ................................. 455/33.1, 34.1, 455/34.2, 54.1, 54.2, 56.1, 53.1, 58.1, 527, 510, 512

[56] References Cited

U.S. PATENT DOCUMENTS

| | | | |
|---|---|---|---|
| 4,399,555 | 8/1983 | MacDonald et al. | 455/507 |
| 4,573,207 | 2/1986 | Smith et al. | 455/518 |
| 4,788,543 | 11/1988 | Rubin | 455/527 |
| 5,101,502 | 3/1992 | Felderman et al. | 455/527 |
| 5,251,327 | 10/1993 | Lenchik et al. | 455/54.2 |
| 5,463,617 | 10/1995 | Grube et al. | 455/54.2 |
| 5,483,670 | 1/1996 | Childress et al. | 455/54.1 |

FOREIGN PATENT DOCUMENTS

9307723  4/1993  WIPO .

*Primary Examiner*—Edward F. Urban
*Attorney, Agent, or Firm*—Pillsbury Madison & Sutro LLP

[57] ABSTRACT

A method implemented in a mobile telephone system in which each subscriber belonging to a group call group and wishing to speak requests a speech item through an interface to the mobile exchange. To avoid problems causes by concurrent requests for a speech transmission turn from two subscribers, the following steps are taken: upon detection of a request for a speech item from a subscriber, priority data specific to the request for a speech item and including a priority is generated, and the mobile exchange switches the speech signal transmitted by that subscriber whose request for a speech item has priority data of the highest priority, for the other subscribers to hear.

30 Claims, 5 Drawing Sheets

METHOD AND APPARATUS FOR PRIORITIZING PLURAL REQUESTS BY SUBSCRIBERS FOR SPEECH ITEMS IN A GROUP CALL ON A RADIO PATH

FIELD OF THE INVENTION

The present invention relates to a method for assigning in a mobile exchange speech items requested by subscribers belonging to the same group call group substantially simultaneously through interfaces to the mobile exchange, in which method a subscriber belonging to a group call group and wishing to speak requests a speech item through an interface to the mobile exchange.

BACKGROUND OF THE INVENTION

The method of the invention is specifically designed for use in what are known as trunked networks, which are typically company networks or government networks in which all channels are shared by several companies or government organizations and in which the subscribers have, in addition to their own subscriber numbers, group numbers indicating the group call group or subscriber group the subscriber belongs to, thus enabling calls intended for members of a predefined group to be switched to subscribers of the group.

A group call is one of the essential functions of a private mobile radio system. A group call is used, for example, in all kinds of operations involving more than one participant, particularly when an entire group must be constantly aware of the progression of events. Typically, subscribers participating in a group call are directed one by one to speak on the same logical radio channel, and in that situation it would be desirable that several subscribers were not switched to speak simultaneously on the same channel.

Traffic in a group call in trunked networks of this kind is nearly always of the semiduplex type, i.e. listening is not possible during transmitting. This affords a significant advantage in that, within the area of one base station, all participants in a call can share the same channel irrespective of the number of participants. Only one subscriber, however, is able to speak at a time. Neither is a subscriber aware upon speaking that another subscriber is speaking at the same time.

In known, particularly analog, trunked radio networks realization of a group call is based on the use of a pressel or PTT (push-to-talk button) as a transmitter switch: by pressing the PTT, the transmitter is switched on, and the subscriber can communicate on the channel. Pressing the PTT also mutes the receiver of the subscriber unit. Each subscriber may attempt to communicate whenever he or she so wishes, and thus it is possible that several subscribers attempt to communicate simultaneously without being aware of one another. If, in a conventional system, more than one participants attempt to speak simultaneously on the same channel, the instantaneous signal strength determines which one will be heard through. If the signals have sufficiently equal power levels, none of them will be distinct enough to be audible. Furthermore, since the receiver of each speaker is muted, the speakers are not aware that the channel they are using is already in use.

The problem becomes more complex if more than one base station is connected to the same group call. In such a case, the normal solution is to add up the speech paths of the base stations in the system, for example by means of a conference connection in the mobile exchange. If two subscribers are speaking simultaneously in the service areas of different base stations, the other subscribers will hear the speech of both parties concurrently. Such a solution is typical of analog networks, but a conference connection can also be employed in digital systems with special arrangements.

The problems presented above can be solved in a digital trunked system, as a solution is known in which concurrent transmission by two subscribers in a group call is prevented, but this occurs only in the area of one base station. Yet the problem exists in practice also between subscribers located within the coverage areas of different base stations, and further between subscribers who are located within the service areas of several exchanges in a trunked network and who belong to the same group call group and participate in the same group call.

The above described prior art solutions are first of all attended by the drawback that concurrent speaking has not been prevented and an individual subscriber cannot be aware that he or she is speaking concurrently with another subscriber until his or her speech item, i.e. speech transmission turn, is over. In the following, a group call executed within the coverage areas of a plurality of base stations is discussed in greater detail. A digital system typically does not employ a conference connection, but the group call is accomplished by switching, similarly as in broadcast, the signal of the currently speaking subscriber, i.e. the speech from the base station involved, to all base stations involved in the call, to be transmitted further to the other group members participating in the group call. The switching is always changed when the speech transmission turn changes, such that the speech or other transmission from the subscriber currently holding the speech transmission turn is sent to all other subscribers participating in the group call.

The solution described above is very functional as long as only one subscriber is speaking at a time. The problem lies in how to proceed if two subscribers are speaking simultaneously within the coverage areas of different base stations. A particular problem is presented by the fact that since only one subscriber at a time is switched through, concurrent speaking is not necessarily detected at all. Neither of the subscribers currently speaking is aware that he or she is speaking concurrently with the other, since listening is not possible during speaking. Nor are the other subscribers aware of the concurrent speaking, since the speech of one subscriber only is switched through. This is a particular problem in government networks and other private mobile radio networks in which vital traffic wherein safety is involved is transmitted, that is, in networks in which it is essential that messages are forwarded to destination swiftly and that the subscriber has certainty that the speech delivered by him or her was received by all members of the group call group.

SUMMARY OF THE INVENTION

It is an object of the present invention to provide a method wherewith the problems presented by simultaneous speech item initiation attempts, i.e. requests for a speech transmission turn, from two subscribers belonging to a group call can be eliminated. In other words, it is an object of the invention to provide a method by means of which the system can recover from fault situations resulting from two subscribers simultaneously requesting permission to have the next speech transmission turn in a group call.

This novel method for assigning speech items to establish group calls between subscribers located within the service areas of a plurality of telecommunications exchanges is achieved with the method according to the invention, which is characterized in that upon detection of a request for a speech item from a subscriber, priority data specific to the request for a speech item and including a priority is generated, and the mobile exchange switches the speech signal transmitted by that subscriber whose request for a speech item has priority data of the highest priority for the other subscribers to hear.

The invention further relates to a mobile telephone system base station, comprising an antenna, a transceiver, a control unit for detecting ends and starts of speech items, the control unit further comprising means for signalling with subscriber stations. This inventive base station is characterized by means for setting a priority for a speech item and inserting this priority into the start signalling for the speech item.

The invention further relates to a mobile exchange in a mobile telephone system, comprising a switching matrix for switching calls to desired subscribers and subscriber groups, an interface unit enabling telecommunication with base stations in the mobile telephone system or other exchanges, a controller means for controlling the switching matrix and transmitting signalling messages to subscribers, a memory for storing identifiers of subscribers connected to the group call and group call identifiers. This inventive mobile exchange is characterized by means for comparing priority data contained in speech item initiation attempts, and, in response to the comparison, commanding the controller means to establish a speech connection or respectively release a speech connection, and that the mobile exchange comprises means for extracting the priority-containing message from speech in the speech item.

The invention is based on priorizing of speech items, so that each speech item has an unequivocal priority value that is unique within a given call. Therefore, when speech items are switched in the mobile exchange of the mobile telephone system, this priority of the speech item is employed to determine which of the speech items is to be switched, i.e., whose request for a speech transmission turn is granted. Further, if one system comprises a plurality of mobile exchanges, the priority relating to each request for a speech transmission turn, i.e. to each speech item, is conveyed to the other mobile exchanges in the system maintaining the group call, in order to enable them to select the subscriber to whom the next speech item in the entire group call area is to be granted.

The advantage with this method for assigning speech items to establish group calls between subscribers located within the service areas of a plurality of telecommunications exchanges is that the invention enables the radio system to recover from a situation resulting from two subscribers involved in the same group call simultaneously requesting a speech transmission turn in a group call extending over the coverage areas of several base stations.

A further advantage of the invention is that the invention enables the radio system to recover from a situation resulting from two subscribers involved in the same group call simultaneously requesting a speech transmission turn in the service areas of a plurality of mobile exchanges maintaining the group call.

A still further advantage of the invention is that it has utility also when a conference switching matrix is employed. In such a situation, the other participants in the call can in fact detect the concurrent speaking, but even in that case the detection and prevention of concurrent speaking achieved with the method is of advantage.

BRIEF DESCRIPTION OF THE DRAWINGS

In the following, the invention will be set forth in greater detail with reference to the accompanying drawings in which.

DETAILED DESCRIPTION OF PREFERRED EMBODIMENTS OF THE INVENTION

When a radio subscriber initiates a speech item at a mobile station, the base station receives a speech item start message containing at least the subscriber number, group number or both. In that situation, the base station or mobile exchange inserts into this message a priority field, which is unequivocal and unique in a manner to be set forth hereinafter. If the base station has inserted the priority field, it forwards the speech item start message thus formed to the mobile exchange, either on a traffic channel or on a discrete control channel. Transmission on a traffic channel is preferable, unless it can be ascertained that transmission over a control channel is so fast in all circumstances that the speech item start message reaches the mobile exchange before initiation of the actual speech transmission. If, on the other hand, the priority field is inserted at the mobile exchange, typically in the interface unit thereof, the speech item start message is forwarded to the controller means of the mobile exchange.

Respectively, the mobile exchange is so configured that if a speech item is simultaneously received at the mobile exchange from subscribers connected to the same group call from different base stations, only the speech item having a priority field of the highest priority is switched further. A speech item having a higher priority will be switched through also when a speech item previously switched from another base station is in progress. This is of particular significance if the call involves several mobile exchanges.

If a group call embraces base stations within the service areas of a plurality of mobile exchanges, speech items must also be transmitted from one mobile exchange to another. In that case, the priority relating to a speech item must also be forwarded from one mobile exchange to another, similarly as from a base station to a mobile exchange, that is, on a traffic channel or on a separate control channel if such a channel is fast enough.

The priority of the speech item is determined as follows. Priorities may be assigned in a fixed or dynamic manner. The values can be selected randomly, or, for example, so as to give the call-establishing subscriber the highest priority. The priority can also be varied (rotated) in such a way that the party that spoke last is assigned a low priority, i.e. those who have not yet been granted a speech transmission turn are favoured, or vice versa, i.e. those who have just recently spoken are favoured under the assumption that shortly after transmission of a speech item there is a need to speak again. The priority may be line-specific, in which case each line, e.g. to a mobile exchange at the other end of which there is a base station, another exchange, a fixed subscriber or a fixed telephone network, has a priority of its own. Additionally or alternatively, the priority can be subscriber-specific.

The priority of a speech item involved here is not to be confused with the priority of the subscriber. The priority of the speech item can be based on the priority of the subscriber, but it can also be partly or entirely based on other factors, as will be understood from the above.

It is essential to the invention, however, that the priority of the speech item is determined in such a way as to make it impossible for two subscribers speaking concurrently to have the same priority for their speech items. This can be achieved for instance by the following techniques:

a) the priority of a speech item is determined on the basis of the numbers of the mobile exchange and the base station, wherein each base station has an unequivocal (fixed) and different priority for a speech item;

b) the priority of a speech item is determined on the basis of the subscriber number, wherein each subscriber has an unequivocal (fixed) and different priority for a speech item.

The above methods are attended by the disadvantage that the priority of the speech item is fixed and always favors the same base stations or subscribers. When dynamic determining of the priority is wished, a priority field having two or more parts can be used for the speech item, where the most significant part of said field is determined by one or more of the following items of information:

i) subscriber priority; a subscriber with a higher priority will have his speech item switched through ii) a random number; a subscriber to whom the speech item is assigned is randomly selected iii) whether the subscriber is the subscriber who initiated the call (the subscriber who initiated the group call will have his speech item switched through)

iv) the time passed from the subscriber's last successful speech item, or the number of the subscriber's consecutive unsuccessful retries for a speech transmission turn after the previous successful speech item (or call initiation).

Such a procedure is called dynamic insertion of priority data. By employing some of this information or a combination of it as the most significant part of the speech item priority, it is ensured that speech transmission turns are assigned impartially or in accordance with a predetermined priority order.

The least significant part of the speech item priority is determined by the number of the mobile exchange and the base station or the subscriber number, so as to ensure that two simultaneous speech items cannot have the same priority.

In the following, an example is given of deciding the priority of a speech item, i.e. a method in accordance with the above description for determining the priority of a speech item. The priority field has a length of 16 bits, and the significance of the bits, wherefrom priority subfields can be formed if necessary, is determined as follows:

B15 1 if the subscriber has a high priority including the right to interrupt another party's speech item, otherwise 0

B14 1 if the subscriber is the initiator of the call, otherwise 0

B13 1 if the subscriber's previous attempt for a speech transmission turn was unsuccessful and the speech item that interrupted it has been terminated, otherwise 0

B12–B10 3-bit random number ensuring equitable assignment of speech transmission turns between normal subscribers B9–B6 identifier specific to the base station; unequivocal and not repeated within the same system area.

The use of an identifier related to a base station normally results in unnecessary increase of the length of the priority field for the speech item. This can be avoided when the identifiers associated with base stations are not fixed, but are assigned group call specifically at the beginning of the call. This, however, poses a limitation on how many base stations can be involved in a group call at a time.

In the following the detection of the start and end of a speech item will be described. In transmission carried out in a digital trunked network, it is not problematic to conclude when the subscriber is speaking and when not. The speech item is initiated by pressing a push-to-talk switch PTT, or pressel, which gives an indication to the system. The speech item is again terminated by releasing said switch.

However, the call may also involve fixed control points and, for example, subscribers in a telephone network. The latter present a problem, since no information is received from the telephone network on the start or end of a speech item. However, as is known it is possible to apply solutions allowing the system to determine whether there is speech on the line or not. Since the solutions involve a certain error risk, it is preferred to use a low priority value with lines from a telephone network in order to prevent interruptions caused by interference in the telephone network or other interference situations in a group call. In the method set forth above, this can be realized for example by setting bits B15 . . . B10 to 0 when the speech item arrives from a telephone network or telephone exchange.

The following will outline the implementation of the method of the invention in a network with a plurality of mobile exchanges. If the group call has been established in the service areas of a plurality of mobile exchanges, the procedure within each mobile exchange may be as set forth above, as long as it is ascertained that the same priority value is not employed twice in the same call. No other synchronization between the mobile exchanges in respect of the group call switching is necessary.

Where only one subscriber is speaking at a time, each mobile exchange switches the speech paths as information on the speech item is forwarded to the pertinent mobile exchange. If two subscribers attempt to speak simultaneously, it is possible that the switching at the different mobile exchanges is instantaneously inconsistent, but as information on both speech items propagates to all mobile exchanges maintaining the group call, each mobile exchange switches through the speech item having the highest priority, with the result that subscribers participating in the call hear the speech of the subscriber whose speech item had the highest priority.

By detection of concurrent speaking is meant in this context a method whereby the system detects two or more subscribers attempting to speak simultaneously in the same group call. By prevention is meant the mechanisms whereby the system either prevents concurrent speaking or minimizes the disadvantages caused thereby to radio traffic. As such, a disadvantage can particularly be regarded disturbance of communication in such a way that the subscriber thinks that the information he conveyed in his or her speech went through, even though the speech item could not be transmitted.

The speech item priority set forth hereinabove and the switching matrix operating on the basis of it actually prevent switching of concurrent speech items, so that only the speech item having the highest priority is switched. A switching matrix operating on this principle, however, will not necessarily detect when concurrent speech items exist. Thus the subscribers can speak concurrently, with none of the subscribers participating in the call necessarily being aware of it.

Detection of concurrent speaking could be executed as a part of the switching matrix. In that case, the switching matrix should be capable of monitoring the priority of the speech items and changing the switching accordingly. This, however, would complicate the structuring of the switching matrix and increase the costs. It will be seen upon reflection that entirely real-time operation is necessary for the switching of the speech items. When a speech item is initiated, it must be possible to change the switching direction immediately. In principle, it is not acceptable to lose anything of the bit stream relating to the speech item, especially if the speech is in encrypted mode. Nonetheless, it is still possible to realize the detection of concurrent speaking as a part of the switching matrix.

On the other hand, concurrent speaking does not set equally high requirements for real-time operation. Therefore, detection of concurrent speaking can be realized by means of separate signalling messages, and thus the detection of concurrent speaking becomes a part of the call control mechanism rather than a part of the switching matrix. It is possible to realize also the switching of speech items by means of signalling messages if the technology employed ensures that the signalling messages reach their destination before the speech stream, also when they propagate over a different route than the speech, so that the switching matrix can be controlled on the basis of the signalling message so rapidly that nothing essential from the speech signal is lost. Hereinafter, it will be assumed that the priority data arrives on the traffic channel as part of the speech-containing bit stream.

When a subscriber initiates a speech item, one of the following arrives at the mobile exchange or is generated by the mobile exchange:

1. a speech signal as a bit stream including a priority field on the basis of which the switching matrix of the mobile exchange selects, in a case of concurrent speaking, the signal to be switched forward; and
2. a signalling message indicating the start of a speech item and including the same priority field value as the actual bit stream.

These may be called by the common name start signalling.

On the basis of the signalling messages, the mobile exchange can easily determine when concurrent speech items are in hand and which of the subscribers cannot have his or her speech item switched through in that situation. A message whereby the speech item of this subscriber is interrupted may be sent to said subscriber, and thus he or she knows that his or her speech item did not get through. This information is highly essential in critical applications, for example in use by the police or rescue services.

As is known, it is possible in a digital mobile telephone system to realize methods for signalling to subscribers also during an outgoing speech item even though the mobile telephone is of the semiduplex type.

The system can incorporate a supplemental feature whereby the priority value of a subscriber is instantaneously increased in a case where the subscriber's speech item has been interrupted in accordance with the present method. Thus it is ensured that also that particular subscriber's speech item will get through. It is obviously practical, however, that the priority is not increased until the ongoing speech item has been terminated, in order not to offer a possibility by means of which anyone can readily interrupt an ongoing speech item. This would easily lead to recurring interruption of speech items, interminably. Such a method is encompassed by the disclosed exemplary method of forming a priority value for a speech item.

Figure 1:
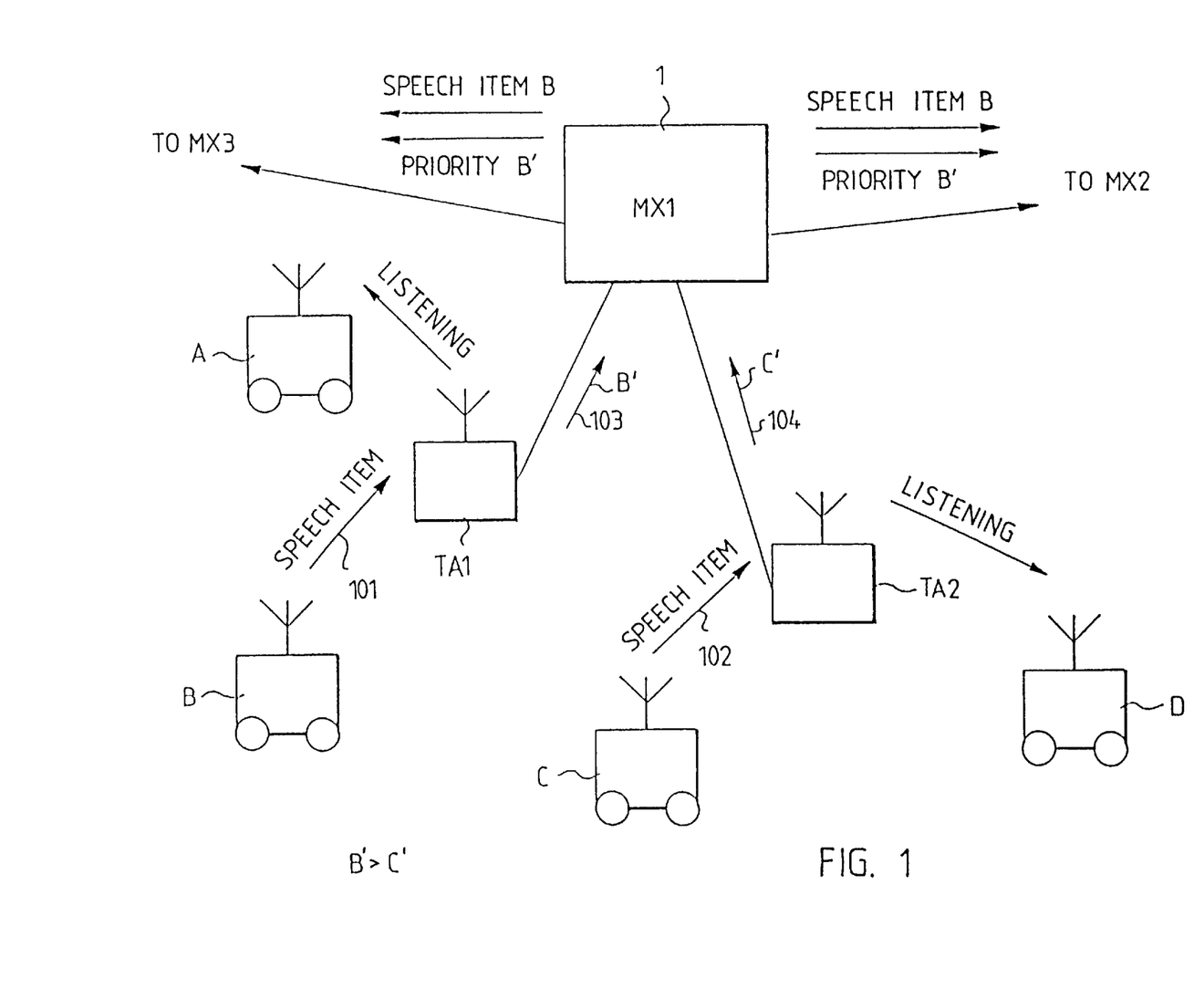
FIG. 1 is a schematic drawing of prevention of concurrent speaking in a group call within the service area of one mobile exchange.

FIG. 1 shows a case of concurrent speaking in the service area of one mobile exchange. The system shown in the figure comprises a mobile exchange 1 and base stations TA1 and TA2. The mobile exchange 1 may have connected to it other base stations not belonging to the group call involved area and thus not shown in the figure. Mobile exchange 1 is connected to other mobile exchanges 2, 3, the effect of which on concurrent speaking will be described hereinbelow. The figure further illustrates four radio subscribers A, B, C and D, who all belong to the same call group. At the moment shown in the figure, this group has an ongoing group call within the coverage areas of base stations TA1 and TA2. The system may also include a plurality of other subscribers not belonging to the pertinent group call group and thus not participating in the group call.

Subscriber B is speaking within the area of base station TA1. Subscriber A is listening within the area of the same base station and subscriber D within the area of base station TA2. The system may include prevention of concurrent speaking within the area of one base station. Such a prevention method is disclosed in PCT Application WO 93/07723, inventors P. Brockman and R. Talarmo.

In the case shown in FIG. 1, subscriber C attempts to speak in a group call simultaneously with subscriber B. Such a situation will easily arise in a group call where the traffic takes place by turns and listening is not possible during transmission. This can occur for instance in a situation where, as one subscriber terminates a speech item, two or more subscribers initiate the next speech item virtually simultaneously. For example, speech transmitted by subscriber B is received at base station TA1. Upon initiation of the speech item, a start message 101, which may be carried in the speech signal or be a separate message, is received from subscriber B. The base station TA1 transmits 103 this message and the ensuing speech to mobile exchange 1, inserting priority data B' for the speech item thereinto. It is to be noted that the priority data for the speech item B' may also be inserted at the mobile exchange 1.

In the case of subscriber C, the same transactions are conducted at base station TA2. In other words, when the speech item is initiated, a speech item start message 102 is received from subscriber C. Base station TA1 transmits 104 this message and the ensuing speech to mobile exchange 1, inserting priority data C' for the speech item thereinto. The technique employed in forming the priority data B', C' is so selected that the priority data B', C' arriving at the mobile exchange from different base stations TA1, TA2 cannot be the same. Several such methods have already been described above. The function of the mobile exchange 1 in prevention of concurrent speaking is to switch forward to all participants in the call the subscriber having the highest priority among the subscribers (e.g. subscribers B and C) accessing to the mobile exchange at a given moment and involved in the same group call. In this case, the priority data B' sent by or generated for subscriber B is higher than the respective priority data C' of subscriber C. It is to be noted that a higher priority will interrupt even an ongoing speech item having a lower priority. By this means, for example relative priorizing of subscribers can be accomplished.

Mobile exchange 1 thus transmits the speech item selected in each case further to all subscribers participating in the group call, to the coverage areas of other base stations, and further to the service areas of other exchanges. For radio subscribers, switching is performed via base stations. A group call may also involve fixed subscribers to whom the speech is transmitted via a fixed or switched telephone connection. If the group call area covers a plurality of mobile exchanges, mobile exchange 1 transmits the speech items via tielines to these mobile exchanges for further delivery.

As stated previously, the priority data for a speech item is formed at base station TA1, TA2 and forwarded to mobile exchange 1. The priority data can also be formed in the mobile exchange 1, for instance in that part of the mobile exchange which interfaces to the base stations, that is, in the interface unit of the mobile exchange. The priority data for speech items arriving from fixed subscribers is formed either in the actual subscriber unit or in that part of the mobile exchange to which the fixed subscribers access, either directly or via a switched telecommunications network.

Figure 2:
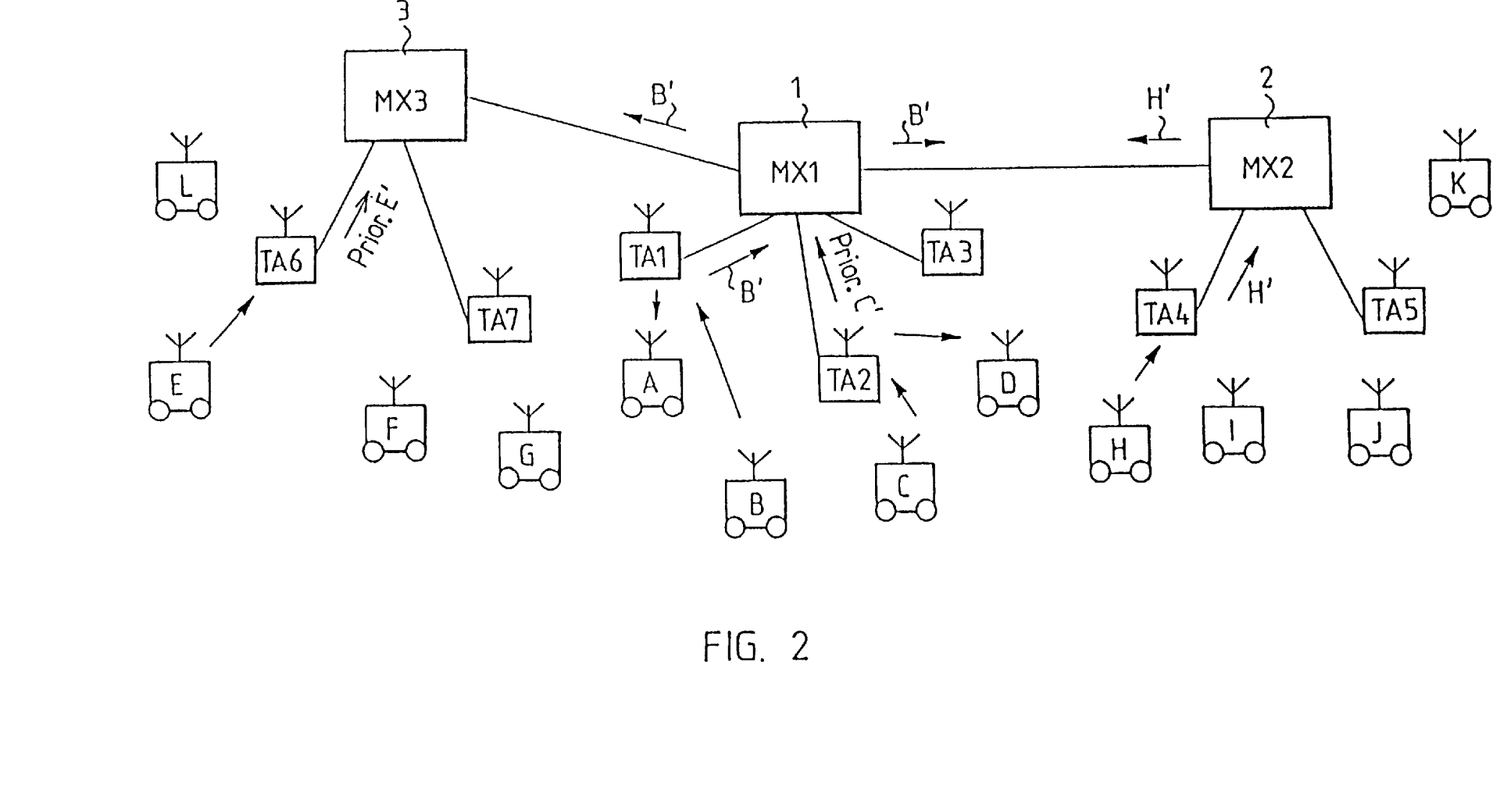
FIG. 2 is a schematic drawing of prevention of concurrent speaking in a group call within the service area of a mobile telephone network constituted by a plurality of mobile exchanges.

FIG. 2 shows prevention of concurrent speaking in a mobile telephone network comprising a plurality of mobile exchanges 1, 2, 3 and including base stations TA1–TA7 associated with said mobile exchanges 1, 2, 3. Within the service area of mobile exchange 1, subscribers B and C initiate a speech item virtually simultaneously, as in the above case of one mobile exchange 1 described in the context of FIG. 1. Mobile exchange 1 determines on the basis of the priorities B' and C', that the speech transmission turn is to be granted to subscriber B, since the priority data sent by it or generated for it was higher than the corresponding priority data C' of subscriber C.

Since the group call also involves base stations TA4–TA7 from other mobile exchanges, i.e. mobile exchanges 2 and 3, the speech item having the highest priority is forwarded— i.e., the speech is switched to these mobile exchanges as well. In that connection, a message containing the priority data of the speech item is forwarded in addition to the speech either on the traffic channel or on a separate control channel. In this case, mobile exchange 1 transmits to mobile exchanges 2 and 3 a message containing the priority data B', since it was higher than the corresponding priority data C' of subscriber C.

Since a plurality of mobile exchanges 1, 2, 3 are involved here, it is to be noted that in this example subscriber H having a priority H' has initiated a speech item virtually simultaneously at mobile exchange 2. At this stage, no speech and no signalling message from mobile exchange 1 has arrived at mobile exchange 2, and thus mobile exchange 2 switches the speech of subscriber H further to mobile exchange 1 and simultaneously sends a signalling message containing the priority H'.

At this stage, a signalling message including priority B' arrives at mobile exchange 2 from mobile exchange 1. Let us assume that priority B' is higher than priority H'. On this basis, mobile exchange 2 interrupts the speech item of subscriber H by releasing the connection from subscriber H via base station TA4 to the other base stations connected to the group call and to other mobile exchanges 1 and 2, and by sending to subscriber H a signalling message by which the speech item initiated by the subscriber is interrupted. The subscriber's mobile telephone terminates the transmission and signals the interruption to the user in an appropriate way via its man-machine interface.

Mobile exchange 2 now switches the speech of subscriber B from mobile exchange 1 further to base stations TA4, TA5 involved in the group call. Subscriber H and the other subscribers located within the service area of mobile exchange 2 and belonging to the group now start hearing the speech item of subscriber B.

At the same time, mobile exchange 1 has received a signalling message transmitted by mobile exchange 2, containing priority H'. Since priority H' is lower than priority B', mobile exchange 1 does not change the switching on the basis of this message. The speech item of subscriber B still remains switched at mobile exchange 1 to base stations and other mobile exchanges involved in the call.

Let us further look at mobile exchange 3, at which subscriber E has also initiated a speech item nearly simultaneously with subscribers B, C and H, but slightly later so that mobile exchange 3 has already received a signalling message containing priority B' from mobile exchange 1 and switched the speech item of subscriber B to the base stations within the service area of mobile exchange 3 which are involved in the group call. When mobile exchange 3 now receives the speech item of subscriber E, bearing priority E', from base station TA6, or respectively when mobile exchange 3 generates the priority data, the mobile exchange discovers, as priority B' is higher than priority E', that the switching executed should not be changed. Mobile exchange 3 interrupts the speech item of subscriber E by a signalling message, and subscriber E starts hearing the speech of subscriber B.

Thus it is seen that, provided the priority values for speech items from different subscribers are always dissimilar within the same call, concurrent speaking is prevented in the system, so that the subscriber having the highest priority can speak and the others have to listen. If two or more subscribers simultaneously initiating a speech item had the same priority, the decisions made at the different mobile exchanges would be inconsistent, and several subscribers could speak at a time while the others are hearing, depending on their location, one of the concurrent speech items. This has been prevented in the method of the invention by ensuring that the speech items sent by the subscribers are never assigned the same priority.

Figure 3:
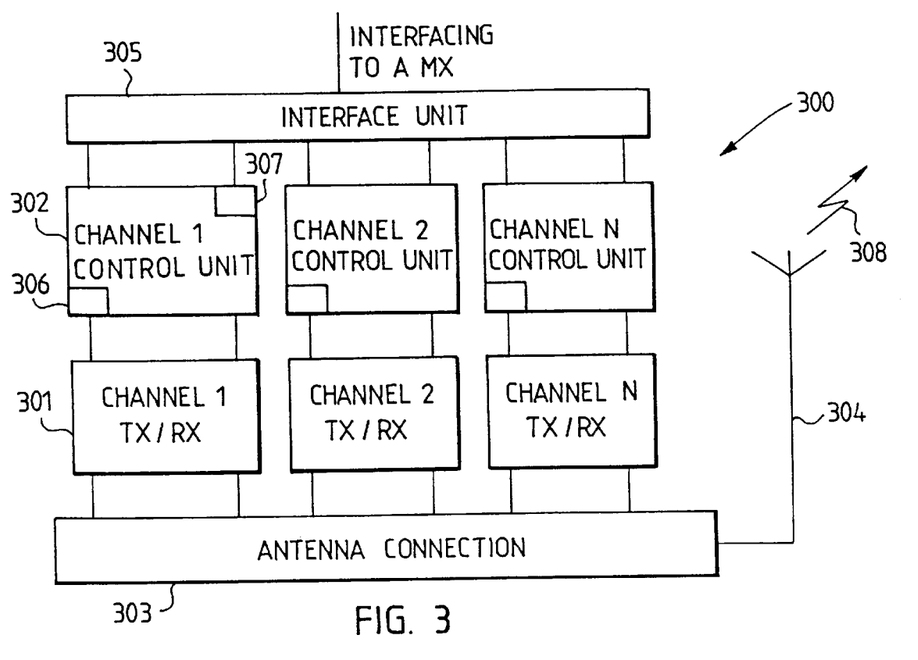
FIG. 3 shows the configuration of a base station in a mobile telephone system used to implement the method of the invention.

FIG. 3 shows the configuration of a base station TA1–TA7; 300. The base station 300 may be a single-channel or multi-channel station. The radio channel may employ time sharing, and thus a single radio channel can accommodate several calls or signalling connections at the same time, or alternatively a radio channel is provided for each speech or signalling connection.

A transceiver unit TX/RX 301 and a control unit 302 are connected with each radio channel. Antenna connection 303 comprises circuits for combining radio channels and adapting them to antenna 304, wherefrom the radio signal is transmitted to radio path 308.

The base station interfaces to a mobile exchange 1, 2, 3 through an interface unit 305. The connection is typically digital, and several traffic or control channels have been multiplexed to the same connection.

The channel-specific control unit 302 incorporates, in addition to its other functions, means 307 for signalling with subscriber stations. The function of the control unit 302 is, among other things, to detect the start and end of a speech item, as well as to detect which of the subscribers A, B, C, D is currently transmitting. The control unit 302 also transmits signalling messages to subscriber stations, i.e. subscribers. This is effected, for example in call establishment and release, but also when a speech item initiated by a subscriber is interrupted in a case of concurrent speaking.

The channel-specific control unit 302 may also include means 306 for setting a priority for a speech item and inserting the priority into the start signalling for the speech item. The control unit 302 can perform this on the basis of a fixed value, for instance employing an unequivocal number assigned for each base station as the priority, or it can receive from the mobile exchange information for dynamic changing of the priority, or it can form the priority as a combination of a fixed part and a dynamic part. In the latter case, the dynamic part need not necessarily be controlled by the mobile exchange, since the fixed part as such suffices to ensure that the same priority value cannot be received from different base stations.

However, the priority of the speech item need not necessarily be formed at the base station, but it may also be formed at the mobile exchange end, as will be set forth hereinafter. It may even be possible to generate the speech item priority already at the mobile station. In that case, it should be ascertained that two mobile stations do not have the same priority, for example by informing the mobiles in advance by sending them the priorities they should use.

Figure 4:
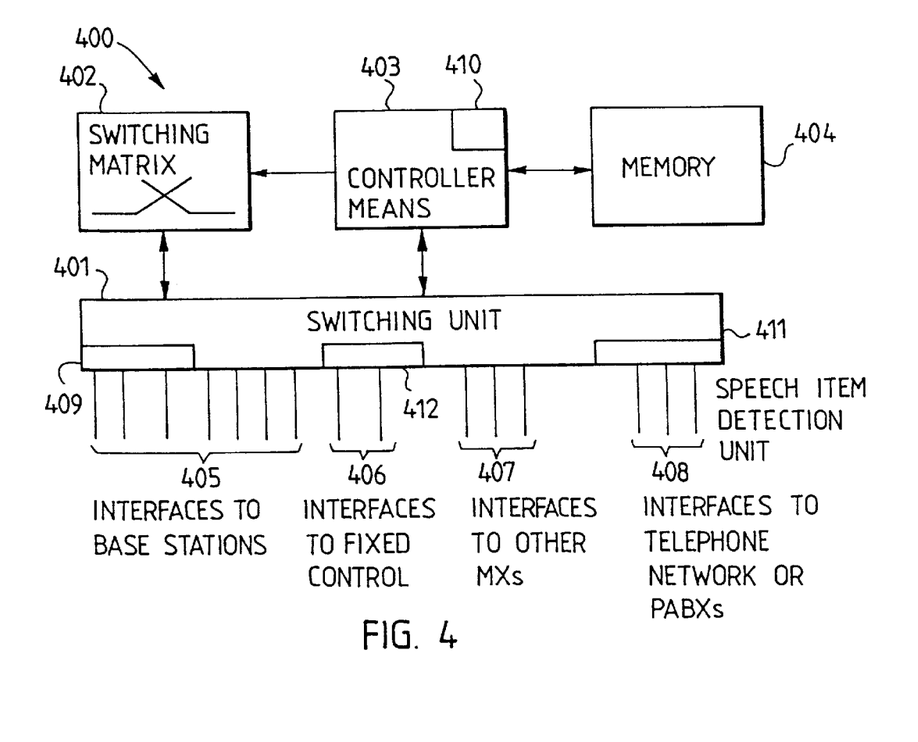
FIG. 4 shows the configuration of a mobile exchange used to implement the method of the invention.

FIG. 4 shows the configuration of a mobile exchange 1, 2, 3; 400. Mobile exchange 400 comprises an interface unit 401, a switching matrix 402 and a controller means 403 with an attached memory 404.

The function of the interface unit 401 is to offer interfaces to base stations TA1–TA7, 405, fixed control points 406— i.e. subscriber stations interfacing by means of a fixed connection instead of a radio connection, such as a dispatcher of a group call group—, other mobile exchanges 1, 2, 3 in the network, 407, and a telephone network and PABXs (Private Automatic Branch Exchanges) 408. The interface unit 401 forwards the speech from various interfaces to switching matrix 402 (and vice versa) and the signalling to controller means 403, which for example establishes and releases calls or switches speech items on the basis thereof.

During a group call, the speech items and the associated priority data arrive from base stations 405, control points 406, and other mobile exchanges 407 to the interface unit 401. The interface unit 401 comprises means 409 for extracting the priority-containing message from speech in the speech item. After having extracted the priority for the speech item, the interface unit 401 transmits the priority-containing message to controller means 403. Controller means 403 stores in the attached memory 404 information on interfaces connected to the group call and the ongoing speech item and its priority, for example by keeping record of identifiers of interfaces and speech items in memory 404. When a new speech item is initiated, unless a speech item relating to the same group call is currently in progress, controller means 403 switches the speech item through the switching matrix to all interfaces involved in the group call. Controller means 403 also transmits to said interfaces a signalling message giving an indication of the speech item and containing priority data therefor.

If during an ongoing speech item a new speech item arrives from another interface associated with the same group call, the controller means 403 compares the priority data for the new speech item with the priority data for the ongoing speech item that it stores in its memory 404. The comparison is performed by comparator means 410 incorporated in the controller means 403. If the priority of the new speech item is lower, the controller means 403 rejects the new speech item and the speech item in progress is carried on. If the priority of the new speech item is higher than that of the ongoing speech item stored in the memory 404, the controller means 403 releases the switching relating to the ongoing speech item in the switching matrix 402, sends a speech item interrupt message to the subscriber of the ongoing speech item, switches the new speech item through switching matrix 402 to interfaces associated with the group call, and sends a message containing the priority of the speech item to the other mobile exchanges involved in the group call, unless the system provides interfaces for fixed control points or subscribers to a telephone network, which are involved in the group call established.

The priority data for the speech item may, instead of being formed at the base station TA1–TA7; 300 or at a fixed control point 406, also be formed in the interface unit 401 of mobile exchange 1, 2, 3; 400. In that case, the interface unit 401 comprises means 409 for forming the priority data for the speech item, and the procedure applied is fully similar.

A telephone network or PABX 408 differs from other interfaces 405, 406, 407 in that it cannot provide a signalling message indicating the start or end of the speech item, and thus the mobile exchange 400 has difficulty in determining when it should switch a speech item and insert the priority data into the signal received from a subscriber. Therefore, if it must be possible to connect also subscribers in a telephone network or PABX 408 to the group call, a speech item detection unit 411 must be included in the interface unit 401, monitoring the signal arriving from the telephone network 408 and seeking to detect the start and end of the speech item. The speech item detection unit 411 transmits a speech item start message thus generated to the controller means 403 of the mobile exchange, inserting thereinto priority data generated on the same principle as in the case of a base station interface 405 or a control point interface 406.

Figure 5:
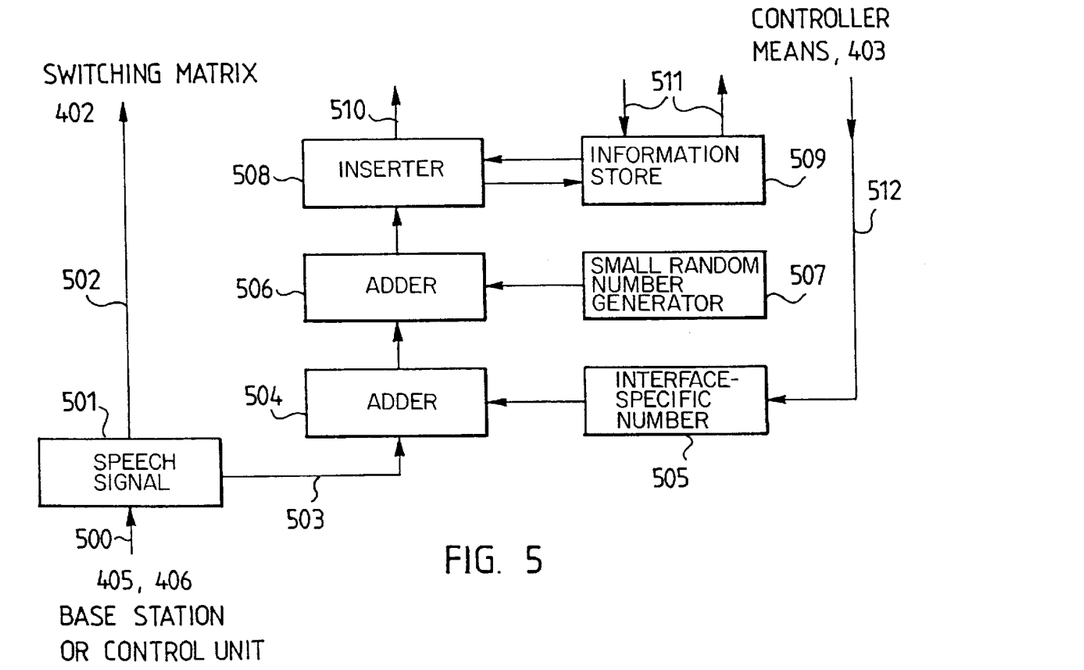
FIG. 5 is a more detailed representation of an interface unit incorporated in a mobile exchange of the invention.

FIG. 5 shows generation of priority data for a speech item at an interface unit 401 of mobile exchange 400 in accordance with the invention, where priority data is generated for speech items arriving from base station interfaces 405 or control point interfaces 406. A signal 500 arriving at the interface unit comprises both a speech signal and start information for the speech item, either in combination or separately. The start information for the speech item is extracted from the speech signal 501 and the speech 502 is forwarded directly to the switching matrix. The start information 503 for the speech item comprises at least the number of the subscriber initiating the speech item. The information may also include subscriber-specific priority data and other information arriving from the subscriber unit, but to prevent misuse or equivalent, it is preferred to insert this information at the mobile exchange, as will be presented herein. An interface-specific number 505 is added to the start information for the speech item in unit 504. This number comprises information 512 set by the controller means 403 and is either fixed and so configured that all interfaces in the system, i.e. interfaces to base stations, control points, telephone exchanges or a telephone network, have dissimilar interface-specific numbers, or determined for each group call so as to assign to the different interfaces different values in the same call.

The next step shown in FIG. 5 is the addition in unit 506 of a small random number generated by unit 507, having e.g. a value 0–7. Thereafter unit 508 inserts, on the basis of information stored in unit 509, priority data and other subscriber-specific data. These include the priority of the subscriber, the right of the subscriber to interrupt any speech item, whether the subscriber is the A subscriber in the call, and whether a speech item initiated by the subscriber has been interrupted, in which case assigning a new speech transmission turn to this subscriber requires that the interrupting speech item has been terminated. Unit 509 receives 511 the necessary information from controller means 403, but for rapid forming of a priority it is important that the information should be available at unit 509 as the speech item starts.

The priority data for a speech item thus formed is transmitted 510 to controller means 403, which again routes it as a signalling message to the other mobile exchanges connected to the group call.

The forming of a speech item priority may also implement a stripped version, so that subscriber-specific priority data 508, 509 are not utilized or are utilized only in part, or that the random number 506, 507 is not used. The interface-specific priority is indispensable for the solution presented here, and from the point of view of the invention replaceable only by a subscriber-specific number.

There are also alternative modes of realizing the solution presented herein. First, the speech signal 502 can be stored in a buffer memory for the duration of forming the priority data for a speech item, so the priority data can be combined with the speech signal and transmitted further in connection with the speech signal.

The base station TA1–TA7; 300, may also form the speech item priority, and in that case the execution is in accordance with the configuration shown in FIG. 5. Steps 510, 511 and 512 then form part of the signalling between the mobile exchange and the base station.

Figure 6:
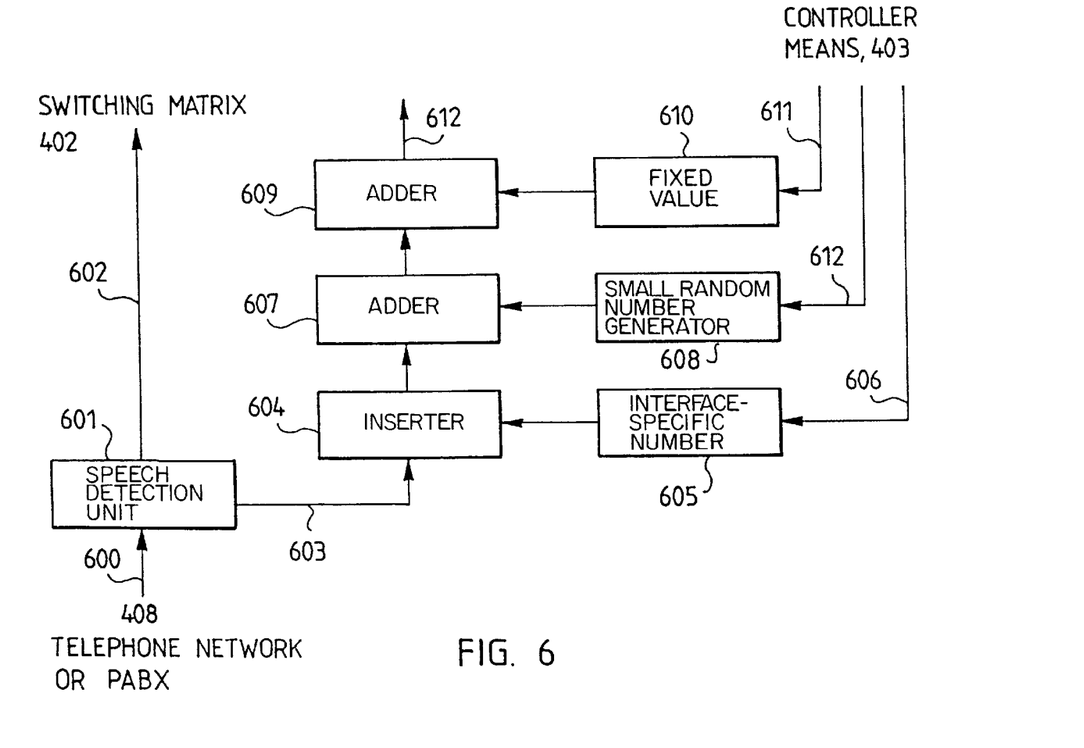
FIG. 6 is a more detailed representation of an interface unit incorporated in a mobile exchange of the invention in a situation where subscribers from a telephone network or telephone exchange access to the interface unit.

FIG. 6 shows the realization of an interface unit in the case of interfacing to a telephone network or telephone exchange 408. Speech 600 arriving from a telephone network or PABX 408 is detected in unit 601, the purpose of which is to indicate when speech is arriving from the interface. This units corresponds to the speech item detection unit 411 shown in FIG. 4. The speech is conveyed 602 as such to the switching matrix 402. Information on the start of a speech item is processed into a speech item start message 603, which may have the same format as in the case of a base station/control point 503, except that in this case the message normally does not contain a subscriber number. An interface-specific number 605, to which the same principles are applied as to information 505, is inserted into the start message in unit 604. The interface-specific number can be set 606 by the controlling means 403. The interface numbers for the telephone network or PABX 408 should preferably be selected to have a lower value than the numbers for other interfaces, in order for disturbances on the lines not to induce prevention or interruptions of speech items.

Unit 607 adds to the priority data for the speech item a small random number, e.g. 0–7, generated by unit 608. The value range of the random number may be set 612 by the controller means 403. Hereafter a fixed value 610, which is set 611 by the controller means 403 to be e.g. 0, is still added 609, and this value further ensures that disturbances possibly occurring on the lines do not cause disturbances in the group call.

The speech item priority data ensuing from operations 604, 607 and 609 is transmitted to the controller means 403, which forwards it as start signalling for a speech item to the other mobile exchanges involved in the group call. This start message may also be combined with the speech signal in such a way that the speech 602 is stored in a buffer memory for the duration of forming the priority of the speech item, and the resultant priority data 612 is combined with the speech signal prior to its transmission to the switching matrix.

In the following, inter-exchange connections are described. No priority data is generated for a speech item arriving from another mobile exchange, but in that case the start message relating to the speech item is received, and it already contains priority data for the speech item. If the speech is routed further to other exchanges, also the original priority data for the speech item is transmitted.

Figure 7:
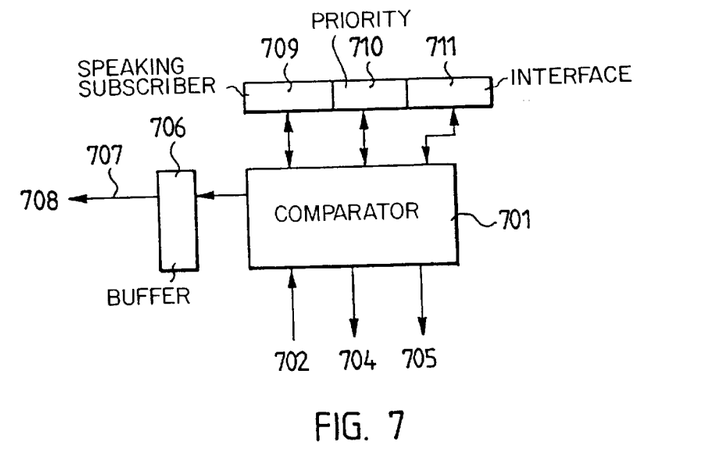
FIG. 7 shows a block diagram of a comparator incorporated in a controller means of the mobile exchange.

FIG. 7 shows a comparator incorporated in the controller means 403 (reference 410 in FIG. 4) of the mobile exchange. The function of the comparator (410; 701) is to select from the speech transmission turns conducted during the group call the one having the highest priority, to control the switching matrix on the basis of the result of this comparison, and to execute the signalling relating to the speech items with the subscribers and other mobile exchanges.

The controller means 403 (FIG. 4) incorporates a comparator 701 receiving speech item start messages 702 from the interface unit 401 (FIG. 4). The start message 702 includes the priority of the speech item. The controller means 403 controls the switching matrix 708 (reference 402 in FIG. 4) so as to effect switching, at each moment, of the speech item having the highest priority among simultaneous speech items. Under the control of the switching matrix 402; 708 the switching control execution can be stored in buffer 706.

The information about the speech item switched in each case is stored in the memory 404 (FIG. 4). This information includes the identity of the speaking subscriber 709, the priority 710 of the speech item and the interface 711 at which the speech item has been switched.

The controller means 403 transmits messages 704 via the interface unit 401 (FIG. 4) for interruption of a speech item to any subscriber whose speech item is interrupted or prevented on account of lower priority. The controller means 403 transmits messages 705 via interface unit 401 to the other mobile exchanges to inform them of the priority of the currently switched speech item.

It is to be noted that the controller means 403; 701 requires the components set forth herein. for each simultaneous separate group call, or the components shall be so configured that they are capable of handling said tasks for several calls simultaneously and independently.

Figure 8:
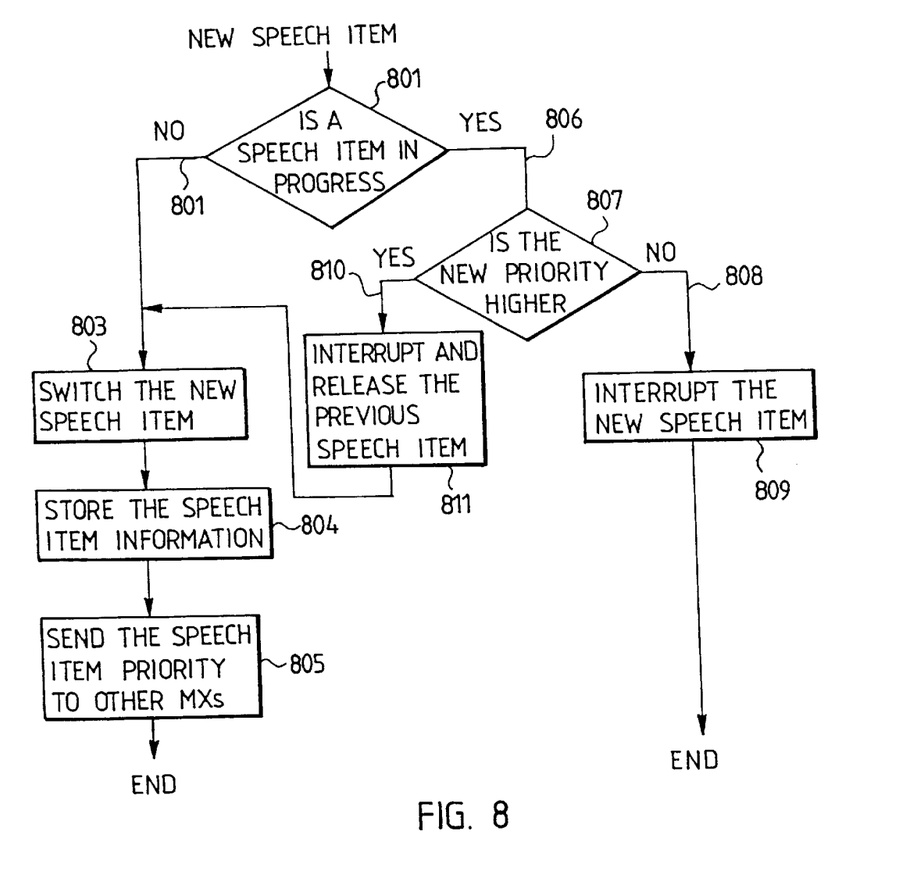
FIG. 8 shows a flowchart of the operation of the comparator at the start of a speech item.

The flowchart shown in FIG. 8 illustrates the operation of the comparator 701 at the start of a new speech item. At step 801, it is checked whether a speech item is in progress. If no speech item is in progress 802 at the moment, the speech item is switched 803, the information 709, 710, 711 on the speech item is stored 804 in the memory 404, and the information 705 on the speech item is transmitted 805 to the other mobile exchanges.

If a speech item 806 is already in progress, the priorities of the new and ongoing speech item are compared 807. If the priority of the ongoing speech item is higher 808, the switching is not changed, but only a message 704 (FIG. 7) is sent 809 to the subscriber who initiated the new speech item in order to interrupt the speech item.

If the priority of the new speech item is higher 810 than that of the ongoing speech item, the previous speech item is interrupted 811 and released, a message 704 is sent to the current subscriber of the ongoing speech item in order to interrupt the speech item, the switching for the ongoing speech item in the switching matrix 402 (FIG. 4) is released, the new speech item is switched 803 in the switching matrix 402, the information on the speech item is stored 804 in the memory 404, and the information on the speech item is transmitted 805 to the other mobile exchanges.

The drawings and the description referring to them are only intended to illustrate the idea of the invention. The method, base station in a mobile telephone system and mobile exchange of the invention may vary in their details within the scope of the claims. Even though the invention has been set forth in the above primarily in the context of trunked mobile radio networks, the invention may be utilized in other mobile telephone systems as well, including conventional mobile telephone networks such as the GSM system.

I claim:

1. A method for assigning speech items in a group call in a mobile telephone system, said mobile telephone system comprising at least one mobile exchange and at least two base stations, the speech items being requested by subscribers belonging to a same group call group through interfaces to the mobile exchange, comprising the steps of:

at least two subscribers of a plurality of subscribers belonging to a same group call group using a radio path and each wishing to speak requesting a speech item through an interface to the mobile exchange by each sending a respective request for a speech item to the mobile exchange via said interfaces, upon detection of requests for a speech item from subscribers, generating by said mobile exchange priority data specific to the respective requests for a speech item and including a respective priority for each said request, each said priority being unique in value, and the mobile exchange switching the speech item transmitted by that subscriber whose request for a speech item at a given time has priority data of the highest priority for the other subscribers belonging to the group call group to hear.

2. A method as claimed in claim 1, wherein said mobile exchange transmits the generated priority data to the other mobile exchanges maintaining the group call.

3. A method as claimed in claim 1, wherein a subscriber belonging to a group call group and wishing to speak initiates a call by transmitting a speech signal on the traffic channel, said priority data specific to the speech item is inserted into the speech signal transmitted by the subscriber as a priority field;

the mobile exchange switches the speech signal transmitted by that subscriber whose signal has a priority field of the highest priority for the other subscribers to hear.

4. A method as claimed in claim 3, wherein the priority field is inserted at a mobile exchange.

5. A method as claimed in claim 3, wherein the priority field is inserted at a base station of the mobile telephone system.

6. A method as claimed in claim 3, wherein the priority field includes a priority subfield indicating the priority of the subscriber.

7. A method as claimed in claim 3, wherein the priority field includes a priority subfield including a random number.

8. A method as claimed in claim 3, wherein the priority field includes a priority subfield indicating the subscriber initiating the call.

9. A method as claimed in claim 3, wherein the priority field includes a priority subfield indicating the time elapsed from the previous speech item assigned to the subscriber station.

10. A method as claimed in claim 3, wherein the priority field includes a priority subfield indicating the number of consecutive failed retries for a speech item made by the subscriber.

11. A method as claimed in claim 1, wherein a subscriber belonging to a group call group and wishing to speak initiates the call by sending a speech item start message indicating the start of the speech item, said priority data specific to the speech item is inserted into the speech item start message sent by the subscriber as a priority field, the mobile exchange switches the speech signal transmitted by that subscriber whose signal has a priority field of the highest priority for the other subscribers to hear.

12. A mobile telephone system base station for an interface between subscribers and a respective mobile exchange which is practicing a method for assigning speech items requested by subscribers belonging to a same group call group using a radio path, through respective like base stations, including said base station, to the mobile exchange, in which at least two of the subscribers who wish to speak each request a speech item from the mobile exchange by sending a respective request for a speech item via a respective one of said base stations, including said base station, via which each subscriber is in communication with the mobile exchange, said base station, upon detecting requests for a speech item generating priority data specific to the respective requests, each including a respective priority which has a unique value, and the mobile exchange switching the speech item transmitted by that subscriber whose request for a speech item at a given time has priority data of the highest priority for the other subscribers belonging to the group call group to hear, said base station comprising:
        an antenna,
        a transceiver,
        a control unit for detecting ends and starts of speech items, said control unit further comprising means for signalling with subscribers, and
        a first priority means for setting a priority which has a unique value for a speech item and inserting this priority into the start signalling for the speech item.

13. A base station as claimed in claim 12, wherein said first priority means for setting a priority for a speech item insert a fixed priority into the start signalling of the speech item.

14. A base station as claimed in claim 12, wherein said first priority means for setting a priority for a speech item insert, in response to information sent by the mobile exchange, a dynamic priority into the start signalling of the speech item.

15. A mobile exchange for use with other mobile exchanges and with mobile telephone base stations which interface the mobile exchange with mobile subscribers in practicing a method for assigning speech items requested by subscribers belonging to a same group call group using a radio path, in which at least two of the subscribers who wish to speak each request a speech item from said mobile exchange by sending a respective request for a speech item via a respective one of said base stations via which the respective subscriber is in communication with said mobile exchange, and said mobile exchange, upon detecting requests for a speech item generating priority data specific to the respective requests, each including a respective priority, which has a unique value, and said mobile exchange switching the speech item transmitted by that subscriber whose request for a speech item at a given time has priority data of the highest priority for the other subscribers belonging to the group call group to hear, said mobile exchange comprising:
- a switching matrix for switching calls to desired subscribers and subscriber groups,
- an interface unit enabling telecommunication with base stations and other mobile exchanges,
- a controller means for controlling the switching matrix and transmitting signalling messages to subscribers,
- a memory for storing identifiers of subscribers connected to the group call and group call identifiers,
- an extracting means for extracting from a speech item initiation attempt a priority data placed in the speech item initiation attempt by a mobile exchange or by a base station,
- a comparing means for comparing priority data contained in speech item initiation attempts, and, in response to said comparison, commanding said controller means to establish a speech connection or respectively release a speech connection.

16. A mobile exchange as claimed in claim 15, wherein said mobile exchange further comprises a second priority means for setting a priority for a speech item and inserting it into the start signalling of the speech item.

17. A mobile exchange as claimed in claim 16, wherein the second priority means for setting a priority for a speech item insert a fixed priority into the start signalling of the speech item.

18. A mobile exchange as claimed in claim 16, wherein the second priority means for setting a priority for a speech item insert a dynamic priority into the start signalling of the speech item.

19. A mobile exchange as claimed in claim 15, wherein said mobile exchange further comprises a detection unit for speech items for detecting the start and end of a speech item from a signal arriving from a telephone network or telephone exchange, and for inserting priority data for the speech item into the start signalling of the speech item.

20. A method for assigning speech items in a group call in a mobile telephone system, said mobile telephone system comprising at least one mobile exchange and at least two base stations, the speech items being requested by subscribers belonging to a same group call group, said method comprising the steps of:
- a subscriber belonging to a group call group and wishing to speak in the respective group call requesting a speech item through an interface to the mobile exchange,
- upon detection of a request for a speech item in the group call from a subscriber, generating in the mobile telephone system priority data for the request for the speech item said priority data for the speech item being different than any other concurrent speech item or request for a speech item in the group call, and the mobile exchange switching the speech item transmitted by that subscriber whose request for a speech item at a given time has priority data of the highest priority for the other subscribers belonging to the group call group to hear.

21. A method as claimed in claim 20 wherein said mobile exchange transmits the generated priority data to the other mobile exchanges maintaining the group call.

22. A method as claimed in claim 20 wherein a subscriber belonging to a group call group and wishing to speak initiates a call by transmitting a speech signal on a traffic channel,
- said priority data specific to the speech item is inserted into the speech signal transmitted by the subscriber as a priority field;
- the mobile exchange switches the speech signal transmitted by that subscriber whose signal has a priority field of the highest priority for the other subscribers to hear.

23. A method as claimed in claim 22, wherein the priority field is inserted at a mobile exchange.

24. A method as claimed in claim 22, wherein the priority field is inserted at a base station of the mobile telephone system.

25. A method as claimed in claim 22, wherein the priority field includes a priority subfield indicating the priority of the subscriber.

26. A method as claimed in claim 22, wherein the priority field includes a priority subfield including a random number.

27. A method as claimed in claim 22, wherein the priority field includes a priority subfield indicating the subscriber initiating the call.

28. A method as claimed in claim 22, wherein the priority field includes a priority subfield indicating the time elapsed from the previous speech item assigned to the subscriber station.

29. A method as claimed in claim 22, wherein the priority field includes a priority subfield indicating the number of consecutive failed retries for a speech item made by the subscriber.

30. A method as claimed in claim 20 wherein a subscriber belonging to a group call group and wishing to speak initiates the call by sending a speech item start message indicating the start of the speech item,
- said priority data specific to the speech item is inserted into the speech item start message sent by the subscriber as a priority field,
- the mobile exchange switches the speech signal transmitted by that subscriber whose signal has a priority field of the highest priority for the other subscribers to hear.

* * * * *